United States Patent [19]
Biddle et al.

[11] 4,034,610
[45] July 12, 1977

[54] DIFFERENTIAL PRESSURE MEASURING DEVICE

[75] Inventors: Joseph Montgomery Biddle, Center Square; Richard Malcolm Hickox, Abington, both of Pa.

[73] Assignee: Leeds & Northrup Company, North Wales, Pa.

[21] Appl. No.: 741,614

[22] Filed: Nov. 15, 1976

[51] Int. Cl.² .................................... G01L 9/04
[52] U.S. Cl. ...................... 73/398 AR; 73/407 R; 338/4; 338/42
[58] Field of Search .............. 73/398 AR, 407 R; 338/4, 42

[56] References Cited

U.S. PATENT DOCUMENTS

| | | | |
|---|---|---|---|
| 3,363,456 | 1/1968 | Laimins | 73/398 AR |
| 3,411,361 | 11/1968 | McLellan | 73/398 AR |
| 3,461,416 | 8/1969 | Kaufman | 73/398 AR |

*Primary Examiner*—Donald O. Woodiel
*Attorney, Agent, or Firm*—Raymond F. MacKay; William G. Miller, Jr.

[57] ABSTRACT

A differential pressure measuring device of the three diaphragm type is disclosed in which the measuring in diaphragm is isolated from the substance being measured by a pair of sealing diaphragms. The measuring diaphragm is included in a cell assembly that provides overrange protection for the measuring diaphragm and isolation of the measuring diaphragm from the influence of static pressure induced housing strains.

6 Claims, 3 Drawing Figures

DIFFERENTIAL PRESSURE MEASURING DEVICE

BACKGROUND OF THE INVENTION

This invention relates to differential pressure measuring devices that produce an indication that varies linearly with the difference in pressure between two sources of pressure. The device of this invention utilizes a measuring diaphragm subjected to the pressure differential and deflected thereby. The deflection of the diaphragm is transmitted to a measuring beam structure that has located on its surface an electrical strain gauge to produce an electrical output signal that varies linearly with respect to the applied differential pressure. The measuring diaphragm itself is protected from the substance whose pressure is to be measured by a pair of sealing diaphragms. The sealing diaphragms in conjunction with the measuring diaphragm form a pair of cavities which are filled with an essentially noncompressible fill fluid. The differential pressure to be measured is thus applied to the measuring diaphragm through the medium of the fill fluid which is located between each seal diaphragm and one side of the measuring diaphragm.

Differential pressure measuring devices are most frequently used in the determination of flow of a fluid in a pipeline. The differential pressure to be measured in such an instance is generated by the difference in pressure existing across an orifice plate or other differential pressure producer located in the pipeline. In such applications it will be recognized that the differential pressure measuring device is, itself, subjected to the existing pressure of the fluid in the pipeline. This pressure can cause distortion in the housing of the differential pressure measuring device that if transmitted to the measuring diaphragm and its support will produce an error in the output measurement. Another problem that exists with respect to the use of such differential pressure measuring devices in a flow measuring system is that such devices are occasionally subjected to differential pressures of magnitudes beyond the range of their designed capabilities. This problem is commonly referred to as overranging and is quite serious because the resulting distortion of the measuring diaphragm may render the device unpredictably nonlinear in its response to differential pressure.

SUMMARY OF THE INVENTION

The present invention overcomes many of the problems that contribute to nonlinearity, hysteresis and repeatability errors and other influence errors experienced in prior art differential pressure measuring devices including those related to assembly procedures, overrange differential pressures, static pressures, temperature variations and the like. It is an object of this invention to provide an overall design of a differential pressure measuring device that during assembly the parts are self-aligning to prevent the introduction of forces that contribute to a nonlinear response of the device.

It is the object of this invention that during assembly the moveable measuring elements of the device may be adjusted to provide operation of the device in its most linear range.

It is a further object of this invention to provide a differential pressure measuring device in which the device is provided with freedom from influence to changes in static pressure.

It is a still further object of this invention to provide a differential pressure measuring device in which changes in temperature are compensated to eliminate any changes in output to solely changes in the temperature of the device.

It is a still further object of this invention to provide an overrange protection system in which the overrange pressure limits may be established under actual pressure operating conditions after the device is partially assembled.

BRIEF DESCRIPTION OF THE DRAWINGS

A better understanding of the present invention may be had when the following detailed description is read in connection with the accompanying drawings in which:

Referring to FIG. 1, the differential pressure cell 10 is shown as comprised of a center disc or ring 11 having an elongated opening 11a (FIG. 2) therethrough and adapted to have secured thereto a support beam 13 and a measuring diaphragm 12. In a typical differential pressure measuring device, measuring diaphragm 12 is constructed of 0.004 inch thick metal and is provided with concentric corrugations in the diaphragm. To those skilled in the art, it is known that the corrugations serve to provide a more linear relationship between the difference in pressure applied to the opposite faces of the measuring diaphragm and the deflection thereof and also to permit greater deflection of the diaphragm in its linear range. In the particular embodiment shown, the diaphragm 12 is provided with a central hole 12a through which extends the pin portion 14a of a shoulder pin 14. To secure the pin to the measuring diaphragm 12, the head of shoulder pin 14 is provided with a projecting ring portion 14b which, when assembled to diaphragm 12, is secured thereto by welding or any other leakproof technique.

Figure 1:
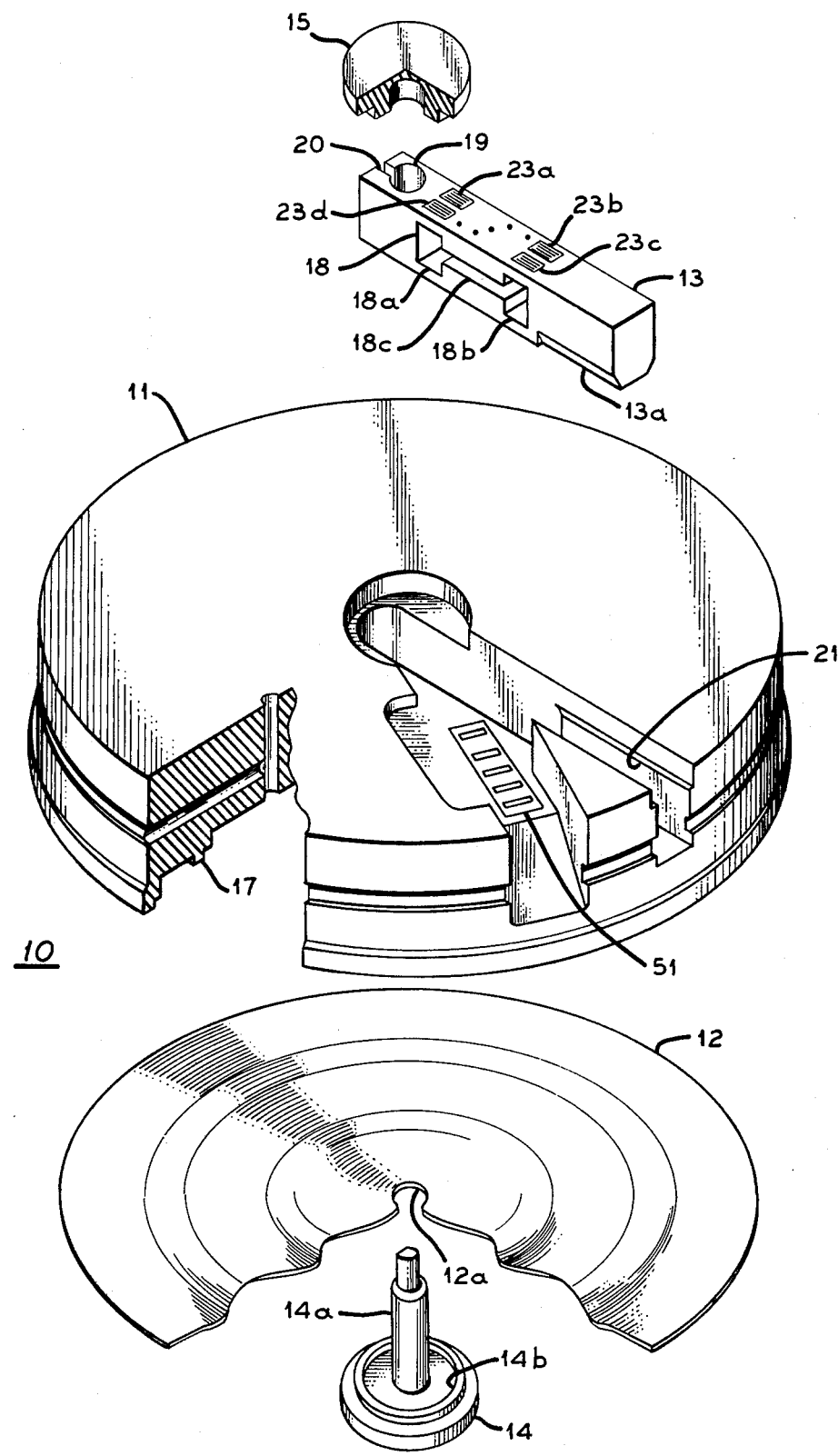
FIG. 1 is an exploded isometric view of a differential pressure cell constructed in accordance with the principles of the present invention.

With the shoulder pin 14 assembled to measuring diaphragm 12, the measuring diaphragm 12 may then be secured to the center disc or ring 11 by welding the measuring diaphragm 12 to a projecting ring 17 of the center disc or ring 11 to provide a sealed joint between the ring 11 and the measuring diaphragm 12. With the measuring diaphragm 12 secured in place on the ring 11, the pin 14a protrudes through the opening 11a (FIG. 2) and differences in pressure applied to the opposite sides of measuring diaphragm 12 produce translational motion of the pin 14a.

Support beam 13, shown in FIG. 1, has a substantially rectangular cross-sectional area. The beam is provided with an opening or slot 18 having two substantially rectangular openings 18a and 18b joined together by an opening 18c having a greater material cross-section than that associated with the openings 18a and 18b. With beam 13 secured at one end and a force applied to the opposite end perpendicular to the beam and to the axis of the openings 18a, 18b and 18c therethrough, it will be understood that the construction of the slot in the beam 13 will provide two regions in which the beam will be deflected in opposite senses. This results in the distal end of the beam moving in a substantially linear direction and with the bending of the beam occurring practically exclusively in the regions of the rectangular openings 18a and 18b. Furthermore, the uniform cross-section of the beam in the regions of the rectangular openings 18a and 18b provides a uniform strain gradiant in those regions. The opening 18c with its greater cross-sectional area of material results in substantially no deflection of the beam in the area of the opening 18c.

In order to obtain an electrical signal related to the bending of beam 13, there are attached to the surface of the beam 13, coextensive with the rectangular openings 18a and 18b, electrically resistive strain gauges 23a, 23b, 23c and 23d together with electrical connectors to the strain gauges (shown in FIG. 1 as dots) located between the strain gauges. Because the bending of beam 13 is limited to the regions defined by the rectangular openings 18a and 18b and the uniform strain gradiant, maximum percentage change of electrical signal and linearity is achieved by limiting the length of the strain gauge elements to the axial length of the openings 18a and 18b.

In the manufacture of differential pressure measuring devices of the deflected beam type, the beam is generally secured to the measuring device by welding or by mechanically holding the beam in position, such as by screws or bolts. A particularly important part of this invention in providing a differential pressure measuring device that is linear in its response is accomplished by the fact that in this invention the support beam 13 is secured in place to the center disc or ring 11 by means of a press fit between the support beam 13 and a radial slot 21 formed in the center disc or ring 11. A press fit is also used between hole 19 and pin 14a for connecting the pin 14a to the beam 13. A relief slot 20 is associated with the hole 19 to eliminate spalling when the parts are pressed together. In order to facilitate the press fit between the beam 13 and the slot 21, the edges of the beam 13 inserted into the slot 21 are chamfered as at 13a.

The great advantage of the use of a press fit between the beam 13 and the ring 11 and a press fit between the beam 13 and the pin 14a is that the beam 13 is radially self-aligning with respect to the ring 11 and the measuring diaphragm 12 and causes pin 14a to assume a perpendicular relationship to the beam 13. In order to avoid any lateral forces on pin 14a and diaphragm 12 and accomplish the desired high degree of linearity, it is extremely important that the pin 14a be assembled with the beam 13 such that the connection between the measuring diaphragm 12 and the beam 13 retains an axial relationship with respect to the measuring diaphragm 12.

It will be recognized that with the press fit connection, variations in the longitudinal dimensions of beam 13 will produce no translational forces on pin 14a and diaphragm 12, as would be the case if the beam 13 were secured with its proximal end abutting a stop portion of ring 11 or relied upon predrilled holes in beam 13 and the ring 11 to provide a securing means. While the beam 13 could be welded to the ring 11, it has been found that such a technique introduces stresses between the beam 13 and the ring 11 as the weld cools that impairs the linearity of the device.

In addition to the elimination of lateral forces on pin 14a by the force fit of beam 13 to ring 11, there exists another significant advantage to the use of the force fit. To those skilled in the art, it is recognized that a measuring diaphragm, such as diaphragm 12, will have its maximum output, that is the maximum deflection with differential pressure, occuring when the rest or zero differential pressure position of the diaphragm 12 is in a plane. It is also known that with such a rest or zero differential pressure position of diaphragm 12 the linearity will not be at its optimum value; i.e. the deflection of the diaphragm 12 is not linearly related to the difference in pressure existing between the two sides of the diaphragm 12. The best linearity for a diaphragm is accomplished by having the center of the diaphragm displaced from the plane of the support of the diaphragm when there is zero differential pressure across the diaphragm. This displacement is generally referred to as the cone height. The use of the force fit of the beam 13 onto the ring 11 and the pin 14a provides the further advantage that, after assembly of the beam 13 and the diaphragm 12 to the support ring 11, the assemblage may be tested to determine if the linearity of the assembly meets the specifications set out for the device. If the linearity of the assemblage is not within an acceptable range, it is possible to re-insert the assembly into an arbor press and to change the cone height of the diaphragm 12 by further forcing the beam 13 into the slot 21 and onto the pin 14a until the cone height and the desired linearity is obtained.

To complete the assembly of the measuring cell 10, there is forced onto the distal end of pin 14a a stop disc 15 whose function will be later described.

Figure 2:
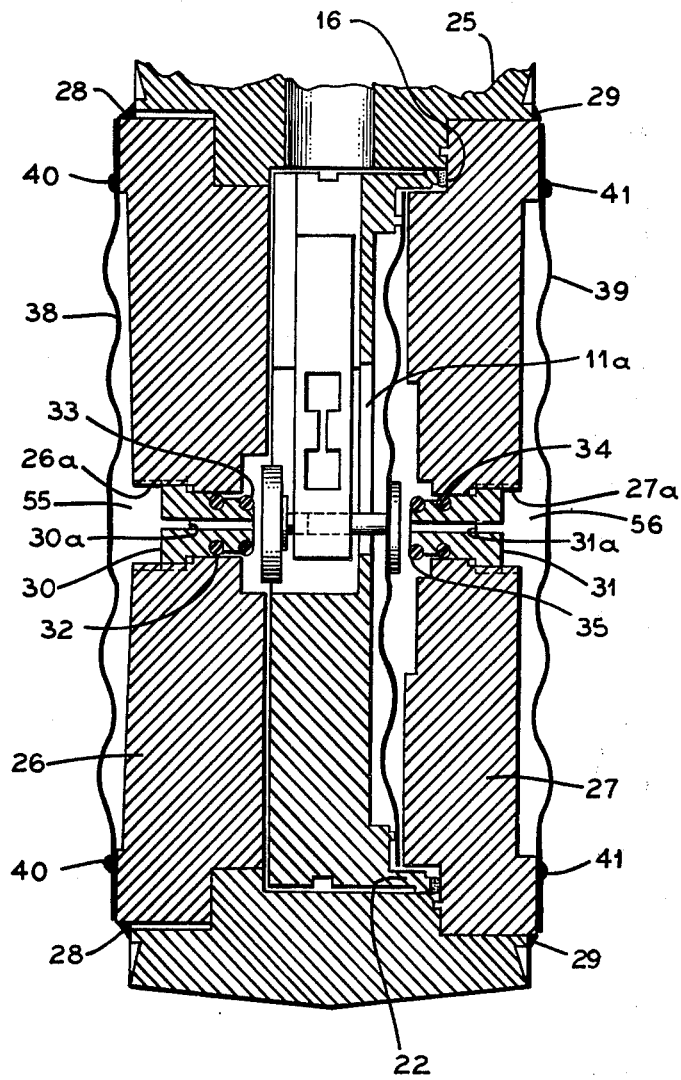
FIG. 2 is a cross-sectional view of an assembled differential pressure capsule including the elements of FIG. 1 together with additional elements.

Referring to FIG. 2, the center disc or ring 11 of the differential pressure cell 10 (FIG. 1) is shown circumferentially secured as by light welding at 16 to the inner wall of a housing member 25 having a substantially cylindrical cavity therein. It will be noted that the center disc or ring 11 includes an axially extending flange or skirt portion 22 located on the circumference of the disc or ring 11. This flange area 22 preferably is of lighter cross-sectional area than the ring 11.

In practice it has been found that when using differential pressure measuring devices on high pressure applications, the housing member 25 may experience dimensional changes produced by the changes in pressure to which it is subjected. If such dimensional changes of the housing 25 are transmitted to the measuring diaphragm 12 and the support beam 13, there would occur variations in output from the differential pressure measuring device not related to the differential pressure but related to changes in the static pressure at which the device was operating. It has been found that this influence from static pressure may be eliminated by the construction as shown in FIG. 2, in which variations in the dimensions in the housing 25 occurring where ring 11 is welded to the housing 25 will not be transmitted to the measuring diaphragm 12 because of the relatively light flange 22 that absorbs the dimensional changes.

There is shown in FIG. 2 the manner in which the differential pressure cell 10 of FIG. 1 is mounted in housing 25 to provide the overrange protection necessary to protect the measuring diaphragm 12. Orifice plates 26 and 27 are inserted into housing 25 and circumferentially welded thereto as shown at 28, 28 and 29, 29 to provide a seal between the housing 25 and the orifice plates 26 and 27. Orifice plates 26 and 27 are provided with counterbored axial holes 26a and 27a, respectively, and cylindrical depressions in the outer faces. The outer portion of each hole 26a and 27a is threaded while the inner part of each hole is smooth. Inserted into the oenings 26a and 27a are orifice screws 30 and 31 having a central hole 30a and 31a, respectively, therethrough. The outer portion of orifice screw 30 is provided with a pair of O-rings 32 and 33 while the outer portion of orifice screw 31 is provided with corresponding O-rings 34 and 35. O-rings 32 and 34 serve respectively to create a seal between orifice screws 30 and 31 and their respective orifice plates 26 and 37. O-ring 33 is located on the distal end of orifice screw 30 in such a manner that when the measuring diaphragm 12 and the stop disc 15 are moved to the left in FIG. 2, the stop disc 15 will seat upon the O-ring 33 to produce a valving action to seal the central hole 30a in the orifice screw 30. Similarly, when the measuring diaphragm 12 is moved to the right in FIG. 2, the O-ring 35 will seal against the head of the shoulder pin 14 to seal the bore 31a in the orifice screw 31.

The function of the orifice screws 30 and 31 is to establish the limits of differential pressure through which the measuring diaphragm 12 will be responsive. As previously indicated, the measuring diaphragm 12 may be damaged if it is subjected to differential pressures significantly greater than those for which it is designed to operate. With the differential measuring capsule partially assembled with the parts as previously set forth, it is possible with this design to set the position of the orifice screws 30 and 31 so that they are precisely in the position desired for the range of differential pressure to which measuring diaphragm 12 should be subjected. This adjustment is readily accomplished by connecting the strain gauges 23a–23d into a measuring circuit to indicate any motion of the support beam 13 and applying to one side of the measuring diaphragm 12 an adjustable pressure. Specifically, if the lefthand orifice screw 30 is to be set, a differential pressure is created across measuring diaphragm 12 by appyling a known pressure to the right-hand side of measuring diaphragm 12. With the pressure so applied, orifice screw 30 is slowly moved inwardly until a change is noted in the electrical output from strain gauges 23a–23d. When this change is noted, no further adjustment is made in the position of orifice screw 30 as it is known that under those small overpressure conditions the O-ring 33 is sealed against the stop disc 15 to produce a valving action. The orifice screw 31 may then be adjusted in similar fashion with the differential pressure across the measuring diaphragm 12 created by the application of a known pressure to the left-hand side of the measuring diaphragm 12 while the orifice screw 31 is adjusted so that the O-ring 35 is pressed against the head of the shoulder pin 14.

While, as described above, the condition of the seal between the O-ring 33 and the stop disc 15 is indicated by a change in the output of electrical strain gauges 23a–23d, other techniques can be used to detect the presence of a seal.

It will thus be understood that the construction of the differential pressure measuring device of this invention permits the overrange protection stops to be readily set while the measuring diaphragm 12 is subjected to a differential pressure, as distinguished from prior art pressure differential measuring devices in which it was necessary to preset the stops in the anticipation that they would provide the overrange protection at the specified or desired limits of differential pressure. When it is considered that the full range movement of diaphragm 12 in a preferred embodiment is only 0.004 inches, the problems of trying to use preset overrange protection devices can be appreciated.

As shown in FIG. 2, an isolating or sealing diaphragm 38 and 39 are respectively attached as by welding to the orifice plates 26 and 27. As shown, these isolating or sealing diaphragms 38 and 39 have peripheral areas such that the entire outer face of the orifice plates 26 and 27 are covered by the diaphragms 38 and 39, respectively. The diaphragms 38 and 39 are suppoted on the orifice plates 26 and 27 by welding at 40 and 41, respectively, to welding rings located on the outer faces of orifice plates 26 and 27.

Figure 3:
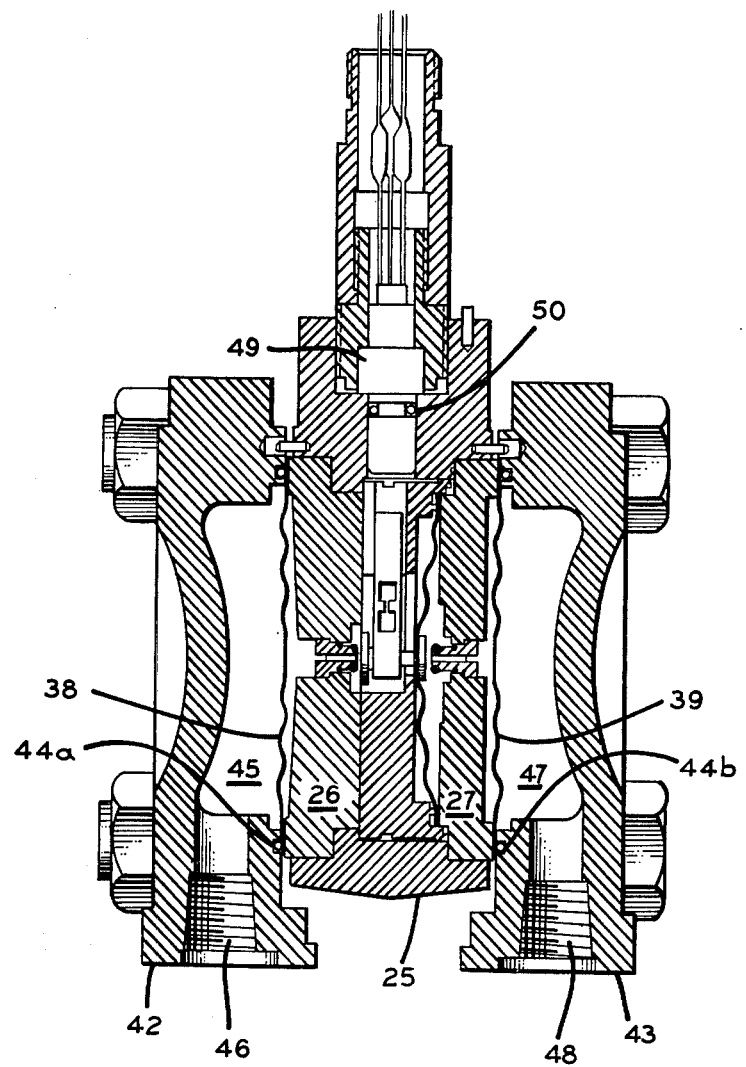
FIG. 3 is a cross-sectional view of a complete differential pressure measuring capsule including the differential pressure cell, as shown in FIG. 1.

Turning now to FIG. 3, there is disclosed a cross-sectional view of a completely assembled differential pressure measuring capsule using the cell 10 disclosed in FIG. 1 and the overrange protection devices as disclosed in FIG. 2. Secured to the outer faces of the diaphragms 38 and 39 are pressure heads 42 and 43. The pressure head 42 is sealed to the peripheral flange of sealing diaphragm 38 by means of O-ring 44a to form a cavity 45 to which is applied one of the pressures to which the differential pressure measuring capsule is sensitive. The pressure may be applied as through hole 46 which desirably is provided with a pipe thread for receiving a pipe which connects to the source of pressure. Similarly, a cavity 47 is established on the other side of the differential pressure measuring device with its threaded hole 48 provided for application of the other of the pressures to which the device is responsive. The pressure heads 42 and 43 having a substantially square-shaped periphery with cylindrical cavities 45 and 47. The pressure heads 42 and 43 are held in sealed relationship with the diaphragms 38 and 39 by bolts passing through the corners of their square-shaped periphery.

In order that the electrical signal from the strain gauges 23a–23d may be transmitted to the outside if the housing 25, there is provided a feedthrough 49 which is sealed to the housing 25 as by an O-ring 50. Through the center of feedthrough 49 pass the electrical leads which are appropriately sealed in place. The electrical leads terminate inside of the housing member 25 at a terminal strip 51 (FIG. 1). The electrical connection is made to the strain gauges in manner well known in the art by fine wires (not shown) connected from the terminal strip 51 to the connecting dots shown between the strain gauges 23a–23d on the support beam 13 in FIG. 1. The strain gauges 23a–23d are connected together in well known manner to form a Wheatstone bridge. The use of five electrical connections permits the insertion, if necessary, of an external resistance in one arm of the bridge.

As shown in FIG. 3, with the differential pressure capsule completely assembled, there are formed a series of cavities sealed one from the other. Cavity 45 is shown existing between the pressure head 42 and the sealing diaphragm 38. One of the sources of differential pressure is connected to the cavity 45 and deflects the diaphragm 38 in accordance with that pressure. Similarly, cavity 47 is formed by pressure head 43 and sealing diaphragm 39. As best shown in FIG. 2, there is a cavity 55 formed between the sealing diaphragm 38 and the measuring diaphragm 12 and another cavity 56 formed between the sealing diaphragm 39 and the other side of the measuring diaphragm 12. The cavity 55 includes all of the spaces surrounding the support beam 13 and the peripheral space existing between the housing 25 and the center disc 11. In the design of a differential pressure measuring device such as disclosed in this invention it is important that the cavities 55 and 56 be kept as small as reasonably possible. In assembly, these two cavities 55 and 56 are filled through proper openings (not shown) with an incompressible fluid so that motion of the diaphragms 38 and 39 may be transmitted through the fluid to the measuring diaphragm 12. As previously explained, the orifice screws 30 and 31 are adjusted during assembly to provide overrange protection. With the assembly completed, the incompressible fluid completely filling the cavities 55 and 56, and with the orifice screws 30 and 31 properly set to define the range of operation of differential pressures for the measuring diaphragm 12, if the differential pressure should exceed the value for which the orifice screws 30 or 31 are set, the valve action of O-rings 33 or 35 of the bores 30a or 31a will trap between the orifice plate 26 or 27 and the measuring diaphragm 12 the fill fluid. With the fluid so trapped, the incompressible fluid creates a fluid stop against the whole surface of the measuring diaphragm 12 in the event that the differential pressure should attempt to rise further and prevents further movement of the diaphragm 12. Additionally, the screw 30 or 31 provides a mechanical stop for the shoulder pin 14 or stop disc 15 to mechanically prevent further motion of the diaphragm. There is thus accomplished by this technique the dual function of a mechanical stop and a hydraulic cushion to support and prevent further motion or deflection of the measuring diaphragm 12 upon increase of the differential pressure beyond the value for which the screws 30 and 31 are set.

In a particular embodiment of the invention the full scale deflection of the support beam 13 is 0.004 inches. It will be appreciated that with such very small mechanical deflections of the measuring beam by the differential pressure that in order to achieve any reasonable degree of accuracy, it is essential that the support beam 13 be isolated from influences due to cause other than the differential pressure, such for example as to any changes due to change in static pressure or changes due to temperature. Additionally, it will be appreciated that with such extremely small full scale deflections of the support beam 13 the adjustment of the orifice screws 30 and 31 to provide the overrange protection as set forth above must be made very precisely and provide for final settings of the screws under actual pressure operating conditions in order to insure that the measuring diaphragm is appropriately protected in the event of overrange of the differential pressures.

It is well known that in order to eliminate changes in the output from the differential pressure measuring device due to changes in operating temperature that there must be no differential pressure created by expension of the fill fluid. In some prior art teachings, provisions are made for threadily inserting a plug into one cavity to change the volume of that cavity to be equal to the volume of the other cavity so that expansion of the fill oil due to temperature changes will be compensated. In order to overcome the problems of temperature change due to the differing coefficients of expansion for the fill fluid and the materials of which the device is constructed, advantage is taken of the construction of the center disc 11 with its flange or skirt portion 22. In a preferred embodiment the center disc or ring 11 is made of 17-4 martensitic stainless steel whereas the housing member 25 is made of 316 stainless steel. It is well known that these two materials have different temperature coefficients of expension so that the space between the housing 25 and the center disc or ring 11 will vary with change in temperature. This variation with change in temperature will provide temperature compensation to substantially eliminate changes in the output from the differential pressure measuring device with changes due solely to temperature changes of the differential measuring capsule. It is to be recognized that if the skirt portion 22 previously described to provide for relief from changes in the dimensions of the housing member 25 due to changes in static pressure were not present that construction of the capsule using materials having differing coefficients of expansion cold not be used as the temperature changes would produce dimensional changes that would be reflected by a displacement of the support beam 13 and a change in electrical signal output not related to the differential pressure applied to the capsule.

One particularly advantageous feature of the flow meter capsule constructed in accordance with this invention is the manner in which the isolating or sealing diaphragms 38 and 39 provide protection for the differential pressure cell from corrosive affects of liquids whose pressure is being measured. As shown, the sealing diaphragms 38 and 39 have skirt portions that extend over the full outer face of orifice plates 26 and 27. In assembly, the O-rings 44a and 44b are inserted between the skirt portion of the sealing diaphragms 38 and 39 and the pressure heads 42 and 43. When a differential pressure measuring capsule is to be used with a corrosive fluid, it is only necessary that the pressure heads and the isolating or sealing diaphragms be constructed of material that will resist the corrosive action of liquid. With such a design the designer is at liberty to select whatever material he considers to be desirable or appropriate for the remaining portion of the differential pressure capsule based upon its ability to withstand pressures and to have desired temperature coefficients.

Although a specific preferred embodiment of the invention has been set forth in detail, it is desired to emphasize that this is not intended to be exhaustive or necessarity limitive. On the contrary, the showing herein is for the purpose of illustrating one form of the invention and thus to enable others skilled in the art to adapt the invention in such ways as meet the requirements of the particular applications, it being understood that various modifications may be made without departing from the scope of the invention.

What is claimed is:

1. A differential pressure capsule comprising:
   a housing member having a substantially cylindrical cavity formed therein;
   a ring-shaped body member having its periphery sealingly mounted in said housing member and having in one circular surface thereof a radially directed slot;
   a measuring diaphragm sealingly secured to the other circular surface of said ring-shaped body member to form with said housing a pair of cavities separated by said diaphragm;
   an axially aligned pin member attached to the center portion of said measuring diaphragm and extending through said ring-shaped body member;
   a beam member of substantially rectangular cross-section having a transverse slot therethrough said slot forming first regions of uniform cross-section areas of said beam separated by an intermediate region having a uniform cross-section area greater than said areas of said first regions, and a transverse hole through one end of said beam in direction perpendicular to said slot and of dimension to form a force fit with said axially aligned pin, the dimension of said beam in the direction transverse to said hole being such to form a force fit with said radially directed slot in said ring-shaped body member; and electric strain gauge means secured to the outer face of said beam within said first regions to provide an electrical quantity varying linearly in accordance with the difference in fluid pressure existing in said housing member on each side of said measuring diaphragm.

2. The differential pressure capsule as claimed in claim 1 additionally including:

first and second seal diaphragms sealingly attached to said housing member on opposite sides of said ringshaped body member;

a noncompressible fill liquid contained in the spaces between said seal diaphragms and said measuring diaphragm; and means for applying to the outer surfaces of said seal diaphragms the differential pressure to be measured.

3. A differential pressure capsule as claimed in claim 2 additionally including:

a first rigid circular disc of diameter less than that of said measuring diaphragm secured to the center of said measuring diaphragm on the side opposite to said axially aligned pin;

a second rigid disc secured to the distal end of said axially aligned pin;

first and second disc members each having a centrally threaded hole therethrough sealingly attached to said housing on each side of said measuring diaphragm between said measuring diaphragm and said seal diaphragm;

first and second threaded screws having an axial opening therethrough located in said threaded holes in said disc members; and sealing means attached to said threaded screws cooperating with said rigid circular discs to seal the opening through said screws upon deflection of said measuring diaphragm by an amount selectively established by the position of said threaded screws.

4. A differential pressure capsule as claimed in claim 1 in which said ring-shaped body member is provided with an axially extending flange at the periphery of said body member whereby said body member is sealingly secured to said housing member along the distal end of said flange to substantially isolate said body member from distortion due to dimensional changes in said housing member.

5. A differential pressure capsule as claimed in claim 2 in which said body member and said housing member are constructed of materials having differing coefficients of thermal expansion to compensate for the unequal thermal expansion of said fill liquid and the materials.

6. A differential pressure measuring capsule comprising a housing member having a substantially cylindrical cavity therein;

a central disc member provided with a central opening therethrough, a radially directed slot in one end face of said central disc member intersecting with said central opening and an axially extending peripheral flange area having its distal end secured to said housing member;

a circular measuring diaphragm having a central hole therethrough and concentric corrugations therein sealingly secured to the other face of said central disc member;

a shoulder pin having its head sealingly secured to said measuring diaphragm with the pin portion extending through said central hole;

a beam member having a hole therethrough dimensioned to provide a force fit with said pin, said beam member fixedly mounted by a force fit into said radially directed slot with said pin extending through said hole;

a stop disc secured to the distal end of said pin;

first and second cylindrical orifice plates having a central hole therethrough and a cylindrical depression therein sealingly secured about their periphery to said housing member with an orifice plate located on each side of said measuring diaphragm with said cylindrical depressions facing outwardly;

first and second circular sealing diaphragms having circumferentially extending skirt portions substantially coextensive with the outer faces of said orifice plates and sealingly secured to said orifice plates along the periphery of said cylindrical depressions;

a noncompressible fill fluid completely filling the spaces between said sealing diaphragms and said measuring diaphragm;

first and second orifice screws having a passage therethrough sealingly mounted in said central holes in said first and second orifice plates;

first and second O-rings mounted on the distal ends of said first and second orifice screws to seal one or the other of said passages when said measuring diaphragm is moved to establish contact between said stop disc or said head of said shoulder pin and one of said O-rings;

first and second pressure heads having cylindrical cavities therein sealingly secured to said skirt portions of said first and second circular sealing diaphragms;

means for applying pressures to said cavities in said pressure heads for developing a differential pressure between said cavities, and electrical strain gauge means secured to said support beam to provide an electrical characteristic varying in accordance with said differential pressure.

* * * * *